United States Patent [19]

Seymus

[11] 3,970,627
[45] July 20, 1976

[54] FLUOROCARBON POLYMER COATING COMPOSITIONS CONTAINING MICA PARTICLES

[75] Inventor: Herman Ernest Seymus, Lint, Belgium

[73] Assignee: E. I. Du Pont de Nemours and Company, Wilmington, Del.

[22] Filed: Sept. 24, 1973

[21] Appl. No.: 400,040

[52] U.S. Cl. .................. 260/29.6 F; 260/42.14; 260/42.15; 260/42.27; 260/42.49; 428/422
[51] Int. Cl.² .................................. C08L 27/18
[58] Field of Search .............................. 260/29.6 F

[56] References Cited
UNITED STATES PATENTS

| | | | |
|---|---|---|---|
| 2,825,664 | 3/1958 | Huntsberger | 260/29.6 F |
| 3,655,604 | 4/1972 | Strolle | 260/29.6 F |
| 3,694,392 | 9/1972 | Werner | 260/29.6 F |

OTHER PUBLICATIONS

Condensed Chemical Dictionary — 3rd Edition, 1942 p. 439.
Kirk-Othmer — Encyclopedia of Chemical Technology, Second Edition — vol. 13, 1967, pp. 398–399, 421–422.

Primary Examiner—Harold D. Anderson

[57] ABSTRACT

Aqueous fluorocarbon polymer coating compositions which contain mica particles or mica particles coated with a pigment such as titanium dioxide are provided. These compositions are useful for coating substrates, especially metallic cookware and bakeware to give a non-stick finish of improved post oil adhesion.

5 Claims, No Drawings

FLUOROCARBON POLYMER COATING COMPOSITIONS CONTAINING MICA PARTICLES

BACKGROUND OF THE INVENTION

1. Field of Invention

This invention relates to aqueous fluorocarbon polymer coating compositions and articles coated therewith and more particularly to such compositions and metallic articles coated therewith having improved post oil adhesion.

2. Prior Art

In recent years, the use of fluorocarbon polymer coatings as non-stick finishes for metal substrates, particularly for cookware, has become widespread. The physical nature of fluorocarbon polymers makes it difficult to adhere them to metallic substrates sufficiently well to prevent coatings of the polymers from blistering and peeling during use. This is especially true for polytetrafluoroethylene.

Adhesion of the coatings has been improved by the addition of a water-soluble alkali metal silicate and colloidal silica to the fluorocarbon polymer coating composition as described in U.S. Pat. No. 2,825,664, issued Mar. 4, 1958 to James R. Huntsberger. In U.S. patent application Ser. No. 348,315 filed Apr. 5, 1973, in the name of Edward J. Welch and assigned to the assignee of this application, now abandoned in favor of a continuation-in-part application Ser. No. 405,798, filed Oct. 12, 1973, adhesion was improved by adding colloidal silica stabilized with sodium ions to the fluorocarbon polymer coating composition.

While the compositions described in the aforesaid references do improve adhesion to unprimed metal substrates, there are some end-use applications where improved post oil adhesion (i.e., resistance to hot oil) is desirable. In cookware, improved post oil adhesion is desirable in such articles as fry pans, meat grills, sauce pans or other articles where fats and oils are in contact with the fluorocarbon polymer coating.

SUMMARY OF THE INVENTION

According to the present invention there is provided an aqueous coating composition comprising:
a. about 40–93%, by weight of the total of (a), (b) and (c) solids, of a fluorocarbon polymer,
b. about 5–35%, by weight of the total of (a), (b) and (c) solids, of colloidal silica stabilized with sodium ions, or a mixture of said silica with a water-soluble alkali metal silicate,
c. about 2–25%, by weight of the total of (a), (b) and (c) solids, of mica particles or mica particles coated with a pigment, and
d. water as a carrier.

There is also provided an article comprising a substrate coated with a fused coating of the abovedescribed coating composition. These fused coatings have improved post oil adhesion.

DETAILED DESCRIPTION OF THE INVENTION

The fluorocarbon polymer used in the composition is of hydrocarbon monomers completely substituted with fluorine atoms or a combination of fluorine atoms and chlorine atoms. Illustrative of such polymers are polytetrafluoroethylene (PTFE), copolymers of tetrafluoroethylene and hexafluoropropylene in all monomer unit ratios, and fluorochlorocarbon polymers such as polymonochlorotrifluoroethylene. Mixtures of these can be used. PTFE is preferred.

The fluorocarbon polymer used is particulate. The particles should be small enough to pass through the nozzle of a spray gun without clogging it and small enough to give the resulting coalescence and film integrity. In ordinary situations, the particles are preferably no larger than about 0.35 micron (average) in the longest dimension.

Although one can use a dry flour or powder of fluorocarbon polymer and provide a liquid carrier separately, it is preferred to use the polymer in the form of an aqueous dispersion because it is most easily obtained on the market in that form. A dispersion of fluorocarbon polymer in an organic liquid miscible with water, such as ethanol, isopropanol, acetone or a Cellosolve, can also be used. In any case, the liquid also serves as a portion of the carrier for the composition.

The fluorocarbon polymer is present in the composition at a concentration of from about 40% through about 93%, by weight of the total of fluorocarbon polymer, mica and colloidal silica solids. A concentration of 50–90% is preferred; 70–90% is even more preferred.

The colloidal silica used in the composition is generally in the form of an aqueous sol. This silica is stabilized with sodium ions, has a particle size of 7–25 millimicrons, a specific surface area of 125–420 square meters per gram, a silica content (calculated at $SiO_2$) of 30–50% by weight, and a pH of 8.4–9.9 at 25°C. Typical of such a colloidal silica are those sold by E. I. du Pont de Nemours and Company as "Ludox HS-40", "Ludox-HS", "Ludox LS", "Ludox SM-30", "Ludox TM", and "Ludox AM". Mixtures of silicas can be used. "Ludox AM" is preferred. This product is a sodium stabilized colloidal silica whose particles are surface-modified with aluminum, having a particle size of 13–14 millimicrons, a specific surface area of 210–230 square meters per gram, a silica content (calculated as $SiO_2$) of 30.0% and a pH at 25°C of 9.0.

The colloidal silica is present in the composition at a concentration of from about 5 through 35%, by weight of the total solids. Instead of colloidal silica, a mixture of colloidal silica and a water-soluble alkali metal silicate can be used as described in U.S. Pat. No. 2,825,664, the disclosure of which is hereby incorporated by reference.

As described in U.S. Pat. No. 2,825,664, any aqueous solution of an alkali metal silicate or mixtures thereof may be used in this invention. Such silicate solutions are available commercially in a wide variety of molar ratios of $SiO_2$ to alkali metal oxide, e.g. from about 1:1 to 4:1. Certain water-soluble alkali metal silicates having an $SiO_2$ molar proportion above 4 can be prepared and may be employed in this invention. Examples of suitable water-soluble alkali metal silicates are potassium silicate, sodium silicate and lithium polysilicate. The ratio of alkali metal silicate to colloidal silica is usually in the range between 25:75 and 90:10 by weight, preferably between 50:50 and 80:20 by weight.

The composition itself is made by simply mixing proper amounts of a suitable colloidal silica sol, with or without an alkali metal silicate, and a suitable fluorocarbon polymer dispersion. This composition can be pigmented, if this is desired, by first preparing a suitable pigment dispersion according to any conventional technique and then adding this pigment dispersion to the silica solfluoropolymer mixture.

Adjuncts such as flow agents, coalescing aids, anti-cratering agents, anti-mudcracking agents and the like can also be added if this appears necessary.

The resulting composition can be applied by spraying, brushing, roller-coating, dipping or the like. If the substrate is metal, this is preferably pre-treated by gritblasting, by the flame spraying of a metal or a metal oxide, or by frit coating, although the composition can be applied successfully to phosphated and chromated non-grit blasted metals. If the substrate is glass, it is preferably first gritblasted or frit coated.

The composition is ordinarily applied at a thickness of 0.2–2.5 mils (dry). After application, the composition is air-dried and the article baked for a time and at a temperature sufficient to fuse the fluoropolymer used.

The composition is most useful for coating cookware, especially bakeware, frying pans, and for coating meat grills, but it can be used to coat any article capable of withstanding the baking temperature used. For example, the composition can be used to coat bearings, valves, wire, metal foil, boilers, pipes, ship bottoms, oven liners, iron soleplates, waffle irons, ice cube trays, snow shovels and plows, chutes, conveyors, dies, tools such as saws, files and drills, hoppers, and industrial containers and molds. It can also be used to coat plastic articles.

The mica particles or mica particles coated with a pigment are available commercially and are generally used at a concentration of about 2 to 25% by weight of the total solids, preferably about 5 to 15% by weight. It is preferred that greater than 80% of the particles have a particle size in the range of about 4 to 50 microns. A mixture of two or more types with different particle size distribution can be used.

Mica particles coated with a pigment, usually a metal oxide such as titanium dioxide, zirconium dioxide, iron oxide, chromium dioxide and vanadium oxide are described in U.S. Pat. No. 3,087,827 issued Apr. 30, 1963 to Edward J. Klenke, Jr. et al., U.S. Pat. No. 3,087,828 issued Apr. 30, 1963 to Howard R. Linton and U.S. Pat. No. 3,087,829 issued Apr. 30, 1963 to Howard R. Linton. The disclosures of these patents are hereby incorporated by reference. Titanium dioxide is the preferred metal oxide.

The invention can be further understood by the following examples in which parts and percentages are by weight unless otherwise indicated.

EXAMPLE 1

A coating composition was prepared by mixing the following ingredients:

| Ingredients | Parts by weight |
|---|---|
| Aqueous polytetrafluoroethylene dispersion[1] | 67.4 |
| Sodium lauryl alcohol sulfate dispersing agent (30% in water) | 3.5 |
| Mica coated with $TiO_2$ with particle size distribution between 5 and 40 microns | 5.1 |
| Carbon black/aluminum silicate dispersion (30% in water, 20% carbon black and 10% aluminum silicate) | 5.0 |
| Colloidal silica stabilized with sodium[2] | 19.0 |
| | 100.0 |

[1]The dispersion contained 60% colloidal polytetrafluoroethylene and 3.5% octyl-phenyl polyglycol ether.
[2]The aqueous colloidal silica contained 30% silica stabilized with sodium, had a $SiO_2/Na_2O$ ratio of 230, a particle size of 13–14 millimicrons and the silica particles surface-modified with aluminate ions. The PTFE to $SiO_2$ ratio in this example is: 100/14.

One coat of this composition was sprayed on a plurality of aluminum panels which were pretreated by grit blasting to a profile of 10 to 15 microns in the normal manner and then baked at 400°C. for 10 minutes. Some dry coatings were about 15 microns in thickness and the remainder were about 30 microns in thickness. A portion of the coated panels were boiled in vegetable oil for 3 hours.

Adhesion of the coating to the substrate was determined as follows:

1. The coating was scratched with a knife down to the metal surface to give a grid of 10 × 10 squares with the lines 2 mm. apart.
2. An adhesive tape was applied over the grid and then pulled off.
3. The number of squares remaining was then determined on a percentage basis. The minimum acceptable level is 70%.

The adhesion of the coatings prepared above was as follows:

1. 100% for the coatings 15 and 30 microns in thickness before boiling in oil.
2. 100% for the coating 15 microns in thickness after boiling in oil.
3. 80% for the coating 30 microns in thickness after boiling in oil.

As a control, panels were coated (15 microns) as above with the same composition except the mica coated with $TiO_2$ was omitted. The adhesion was 60% after boiling in oil.

EXAMPLES 2–4

Example 1 was repeated except that varying amounts of mica coated with $TiO_2$ were used in the composition. The amounts of mica used and the adhesion results after boiling in oil are shown in Table I.

TABLE I

| Example No. | Parts mica | Coating thickness | Adhesion |
|---|---|---|---|
| Control | 0.93 | 15 microns | 65% |
| 2 | 2.5 | " | 70–75% |
| 3 | 7.7 | " | 85% |
| 4 | 7.0* | " | 85% |

*Example 4 used mica having a particle size distribution between 5 and 40 microns.

Similar results can be obtained when an equivalent amount of fluorinated ethylene propylene (FEP) is substituted for the polytetrafluoroethylene.

What is claimed is:

1. An aqueous coating composition consisting essentially of:
   a. 40–93%, by weight of the total of (a), (b) and (c) solids, of a particulate fluoropolymer,
   b. 5–35%, by weight of the total of (a), (b) and (c) solids, of colloidal silica stabilized with sodium ions, or a mixture of said silica with a water-soluble alkali metal silicate, in a ratio in the range between 25:75 and 90:10 respectively,
   c. 2–25%, by weight of the total of (a), (b) and (c) solids, of mica particles coated with a pigment, and
   d. water as a carrier.

2. The composition of claim 1 wherein the particles in (c) are about 5–15% by weight of the total solids and greater than 80% of the particles are in the range of about 4 to 50 microns in size.

3. The composition of claim 2 wherein the fluorocarbon polymer in (a) is polytetrafluoroethylene.

4. The composition of claim 3 wherein the particles in (c) are mica particles coated with titanium dioxide.

5. The composition of claim 4 wherein the solids of (a), (b) and (c) are about 50–90% by weight (a), about 5–35% by weight (b) and about 5–15% by weight (c).

* * * * *

UNITED STATES PATENT OFFICE
CERTIFICATE OF CORRECTION

PATENT NO. : 3,970,627
DATED : July 20, 1976
INVENTOR(S) : Herman Ernest Seymus

It is certified that error appears in the above-identified patent and that said Letters Patent are hereby corrected as shown below:

Column 4, lines 63 and 64 delete "said silica with a water-soluble alkali metal silicate," and substitute therefor --a water-soluble alkali metal silicate with said silica--.

Signed and Sealed this

Eighth Day of March 1977

[SEAL]

Attest:

RUTH C. MASON
Attesting Officer

C. MARSHALL DANN
Commissioner of Patents and Trademarks